Oct. 18, 1949.    H. N. WRIGHT    2,485,127
RELEASABLE IMPLEMENT HOOK
Filed Feb. 11, 1946    2 Sheets-Sheet 1
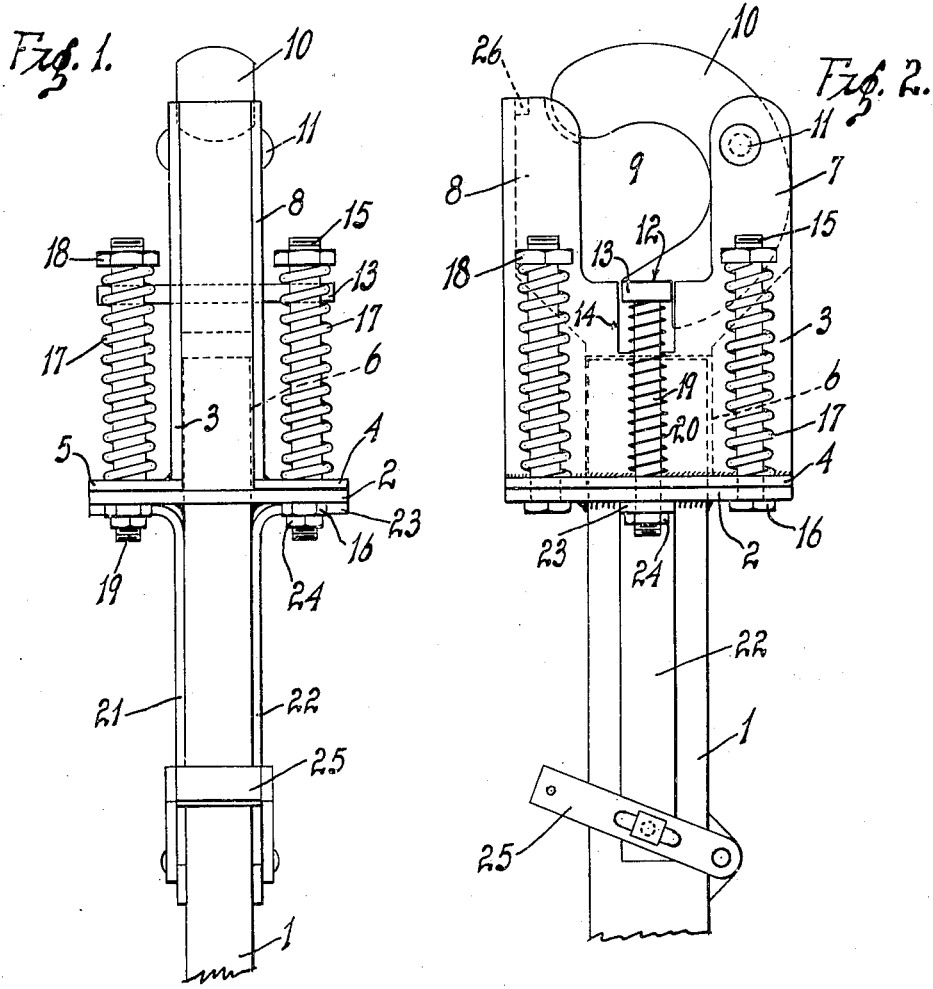
INVENTOR.
Hazelet N. Wright.
BY
ATTORNEY.

Oct. 18, 1949.     H. N. WRIGHT     2,485,127
RELEASABLE IMPLEMENT HOOK

Filed Feb. 11, 1946     2 Sheets-Sheet 2

INVENTOR.
Hazelet N. Wright.
BY
ATTORNEY.

UNITED STATES PATENT OFFICE 2,485,127

RELEASABLE IMPLEMENT HOOK

Hazelet N. Wright, Inglewood, Calif.

Application February 11, 1946, Serial No. 646,878

3 Claims. (Cl. 280—33.16)

This invention relates to a releasable implement hook which is suitably attached to a vehicle, such as a tractor or the like, and is hitched to an implement or truck, or the like, and the prime object of my invention is to provide a novel means of releasing the load if the pull thereon becomes greater than the amount for which the implement hook is set.

An object of my invention is to provide a novel releasable implement hook which can be quickly and easily adjusted for varying loads.

Another object of my invention is to provide a novel releasable implement hook which can be variously adjusted from a rigid or non-releasable hook to a releasable device, as may be desired.

A feature of my invention resides in the plurality of springs against which the load on the hook presses, these springs each being adjustable to vary their tensions.

Still another object of my invention is to provide a novel and effective means of manually tripping the hook so that the load may be either released or attached without requiring that the user handle the hook or that he place himself between the tractor and the load.

Other objects, advantages and features of invention may appear from the accompanying drawing, the subjoined detailed description and the appended claims.

In the drawing:

Figure 1 is an end view of my releasable implement hook.

Figure 2 is a side elevation of the same.

Figure 3:
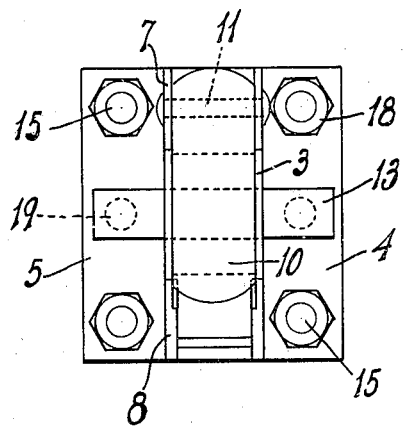
Figure 3 is a top plan view of the same.
Figure 4:
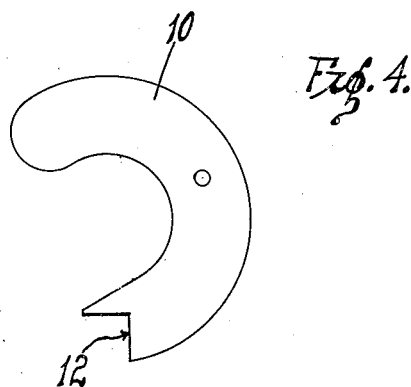
Figure 4 is a side view of the hook.

Referring more particularly to the drawing, the numeral 1 indicates a draw bar, which is suitably attached at one end to the power vehicle, all of which is usual and well known. A flange 2 is either fixedly mounted on the draw bar 1, or may be an integral part thereof. A hook frame 3 is formed with outwardly extending flanges 4, 5, these flanges resting on the flange 2. The hook frame 3 is formed with a recess 6, into which the upper end of the draw bar 1 extends, the purpose of this construction being to provide a bearing or support for the hook frame so that the frame will not tend to tilt or move relative to the draw bar 1 when a load is applied.

The hook frame 3 is provided with upstanding ears 7 and 8, and a recess 9 between them, this recess providing a space into which the eye (not shown) on the implement can extend. A hook 10 is pivotally mounted between the ears 7 on the pin 11. A notch 12 is formed on the lower end of the hook 10, and the purpose of this notch will be further described. A lock bar 13 fits in the notch 12 and moves relative to the hook 10 in a recess 14, said recess extending into the recess 9. Four bolts 15 extend upwardly through the flanges 2 and 4, and the head 16 of the bolts bear against the bottom of the flange 2. Coil springs 17 surround the bolts 15, and one end of these springs bears against the flanges 4 or 5, and the other ends against adjusting nuts 18, which screw onto the top of the bolts 15. It will be evident that the tension of the springs 17 can be varied by means of the adjusting nuts 18. When the load on the hook 10 exceeds the normal tension of the springs 17, the springs will compress—that is, the flanges 4 and 5 will tend to move away from the flange 2, thus compressing the springs. At each end of the latch bar 13, there is provided a post 19, this post extending downwardly through the flanges 2, 4, or 2 and 5, and furthermore the post is slidable through both of these flanges. A spring 20 surrounds each of the posts 19, and the purpose of these springs is to yieldably press the lock bar 13 into the notch 12. On each side of the draw bar 1, I provide a releasing strap 21 and 22. These straps are bent outwardly at their upper end, as shown at 23, to form an L-shaped structure. The posts 19 extend through these outward extensions 23, and a nut 24 is threaded onto each of the posts and bears against its respective strap 21 or 22, and by moving the nut 24 on the post, the position of the latch bar 13 can be adjusted in the notch 12.

A yoke 25 is pivotally attached to the draw bar 1 and to each of the straps 21 and 22, and this yoke has a cable attached thereto which is manipulated by the operator of the moving vehicle—that is, by pulling on the cable, the yoke 25 is swung, which pulls the straps 21 and 22 downwardly, thereby pulling the post 19 and latch bar 13 downwardly, and thereby releasing the hook 10.

The hook 10 is automatically released under an excessive load in the following manner:

The latch bar 13 has a fixed position within the notch 12, depending on how the posts 19 are adjusted longitudinally. Under an excessive pull, the springs 17 will compress. This causes the hook frame 3 to move away from the flange 2, and since the post 19 cannot move relative to the flange 2, the hook 10 will be (in substance) pulled away from the latch bar 13 until the latch bar moves out of the notch 12, and at this time the hook will rotate around the pin 11 and the load will be released.

To reset the hook, the operator pulls on the yoke 25 to retract the latch bar 13, and the hook can then be rotated into latched position, as shown in Figure 2. To prevent the hook 10 from rotating too far, a stop 26 is provided between the ears 8.

It is obvious that the movement of the springs 17 can be varied to suit various load conditions, and the same is also true of the springs 20.

Having described my invention, I claim:

1. In a releasable implement hook, a drawbar, a hook frame mounted on said drawbar, ears on said hook frame, said ears having a recess between them, a hook pivotally mounted between said ears, said hook frame being movable longitudinally of said drawbar, a stationary flange on the drawbar, spring means pressing the hook frame against said flange, said hook having an elongated notch formed therein, a latch bar engageable with the notch in the hook, a post fixedly mounted on the latch bar, said post extending through the flange, a nut threaded on the post and bearing against the flange to adjust said post, and the bar, relative to the hook, a spring encircling the post and bearing against the latch bar to press said latch bar into the notch, and engaging the hook, a yoke pivotally mounted on the drawbar, a link extending from the yoke and connected to said post, said yoke being manually operable to pull the post and the latch bar out of engagement with the hook.

2. A releasable implement hook comprising a drawbar, a hook, a hook frame mounted on said drawbar, said hook being rotatably mounted in said frame, said hook frame being movable longitudinally of said drawbar, a stationary flange on the drawbar, spring means pressing the hook frame against said flange, said hook having a notch formed in the lower surface thereof, said hook frame having guide means located centrally thereof and extending longitudinally therein, a latch bar mounted to slide in said guide means and extending transversely of said hook and hook frame, said latch bar being located to enter said notch and engage the hook, a post extending from and secured to the bar, said post extending through the flange, a spring surrounding the post and bearing against the latch bar and against a portion of said hook frame, said spring pressing said latch bar into engagement with the hook, means to manually operate said latch bar, said means being connected at one end to said post and connected at its other end to said drawbar by a manually operated lever.

3. A releasable implement hook comprising a drawbar, a hook, a hook frame mounted on said drawbar, said hook being rotatably mounted in said frame, said hook frame being movable longitudinally of said drawbar, a stationary flange on said drawbar, spring means pressing the hook frame against said flange, said hook having a notch formed in the lower surface thereof, said hook frame having guide means located centrally thereof and extending longitudinally therein, a latch bar mounted to slide in said guide means and extending transversely of said hook and hook frame, a second guiding means located in the lower portion of said hook frame to receive an end portion of said drawbar, said second guiding means extending longitudinally of said hook frame and arranged symmetrically in alignment with said first named guiding means, said latch bar being located to enter said notch and engage the hook, a post extending from and secured to said bar, said post extending through the flange, a spring surrounding the post and bearing against the latch bar and against a portion of said hook frame, said spring pressing said latch bar into engagement with the hook, means to operate said latch bar manually, said means being connected at one end to said post and connected at its other end to said drawbar by a manually operated lever.

HAZELET N. WRIGHT.

REFERENCES CITED

The following references are of record in the file of this patent:

UNITED STATES PATENTS

| Number | Name | Date |
|---|---|---|
| 1,361,166 | Miller | Dec. 7, 1920 |
| 1,379,874 | Miller | May 31, 1921 |
| 1,859,649 | Den Besten | May 24, 1932 |
| 2,271,748 | Strandlund | Feb. 3, 1942 |